Patented Feb. 19, 1935

1,991,999

UNITED STATES PATENT OFFICE 1,991,999

SQUALENE DERIVATIVE AND PROCESS OF MAKING THE SAME

Hugh Mills Bunbury, Prestwich, Manchester, and Wilfred Archibald Sexton, Huddersfield, England, assignors to Imperial Chemical Industries Ltd., a corporation of Great Britain No Drawing. Application January 14, 1931, Serial No. 508,802. In Great Britain January 22, 1930

35 Claims. (Cl. 260—154)

This invention relates to the manufacture of phenolic condensation products of squalene.

The liver oils of the shark and other elasmobranch fish, as is well known, often contain a large proportion of hydrocarbon or mixture of hydrocarbons to which the name squalene or spinacene has been given. This hydrocarbon or the chief constituent of the mixture is highly unsaturated. It appears to possess a chemical constitution represented by the formula $C_{30}H_{50}$ and to be a di-hydro-tri-terpene. It forms well defined compounds with halogens and the halogen halides.

This invention has for an object the preparation of new reaction products of halogen derivatives of squalene and hydroxy substituted benzene and buta-dienylene substituted benzene and new reaction products of unsubstituted aryl hydroxides and halogen derivatives of squalene. A general advance in the art and other objects which will appear hereinafter are also contemplated.

Broadly speaking the objects of this invention are accomplished by causing halogen containing derivatives of squalene to interact with hydroxy aryl compounds under appropriate conditions in the presence or absence of a condensing agent and/or a solvent.

The invention will be readily understood from a consideration of the following examples.

Example I

One hundred (100) parts of glacial carbolic acid was melted and 1 part of anhydrous aluminum chloride added. The mixture was stirred at 66–70° C. while 10 parts of squalene hexahydrobromide was added by portions, and then the temperature was raised to and kept at 80° C. for 8 hours, after which time the evolution of hydrogen bromide ceased. The cooled mixture was then dissolved in 5% caustic soda solution, filtered, and the clear filtrate acidified with 50% acetic acid, whereby the condensation product was precipitated as a light brown flocculent mass. This was collected and washed with water until free from acid. It dissolves readily in caustic alkalies.

Example II

One hundred (100) parts of glacial carbolic acid were melted and 1 part of anhydrous aluminum chloride added. The mixture was stirred and kept at 70–80° C. while 10 parts of squalene dodecabromide was added by portions. Heating and stirring was continued for four hours. The mixture was then dissolved in 4 litres of 1.5% caustic soda solution. Two hundred (200) parts of 50% acetic acid was added, whereupon the new compound precipitated as a flocculent mass which when filtered, washed and dried, formed a pale brown powder. The product may be purified by redissolving in caustic soda and reprecipitation. It has no well defined melting point but fuses between 120° C. and 130° C. It dissolves readily in caustic alkalies and interacts with diazonium salts to yield highly colored azo compounds.

Example III

A mixture of 10 parts of squalene dodecabromide, 100 parts of a-naphthol, 1 part of aluminum chloride and 100 parts of nitrobenzene were heated gradually to 120° over a period of 1½ hours, and kept at that temperature for a further period of 7 hours with efficient agitation and the further addition of 1 part of aluminum chloride. After this period of heating no further evolution of hydrogen bromide was noticed. The mixture was then distilled in a current of steam to remove the nitrobenzene. The excess of a-naphthol was removed from the new compound by decantation. The residue was extracted with 5% sodium hydroxide solution, and the clarified extract precipitated with glacial acetic acid, whereby the new compound was obtained as a gelatinous precipitate. It is readily soluble in alkalies.

This invention is not dependent upon the mode of preparation of the squalene polyhalide. These polyhalides for example, squalene-dodecabromide, may be prepared by the bromination of purified squalene, by the interaction of the crude fish liver oil with bromide or any other convenient or desirable method.

In the above examples the reaction has been carried out in the presence of aluminum chloride. Condensing agents other than the aluminum chloride of the above examples may be used if found desirable.

It will be obvious to one skilled in the art that the weak caustic soda solution of the above examples may be replaced by other weak caustic solutions without detriment to the success of the process. The same applies to the use of a solvent where the nature of the compounds treated is such as to warrant its use.

The invention includes the reaction of a plurality of phenols with a plurality of halogen derivatives of squalene.

By the terms "phenols" or "phenolic compounds" it is intended to cover hydroxy aryl compounds, that is those compounds containing the functional grouping

it being understood that the carbon atom of the above group forms a part of an aromatic neucleus. The word "phenol" itself is used to cover the common phenol (also known as carbolic acid), that is, monohydroxy - benzene. Alpha - naphthol, the phenolic compound of Example III, is a monohydroxybenzene, specifically 1-hydroxy - 2:3 - (1':4' - butadienylene) - benzene, therefore the phenolic compounds of Examples I, II and III are hydroxy substituted members of the group consisting of benzene and 1':4'-buta-dienylene substituted benzene.

The products of this invention are new and technically valuable phenolic condensation compounds of a highly complex nature containing hydroxy groups which still retain the phenolic function. These hydroxy-phenyl-squalenes are valuable intermediates for the manufacture of dyestuffs since they couple readily with diazotized amines. Azo compounds can be obtained which are readily soluble in alkali and which contain no acid groups. These compounds have distinct anti-ageing properties which render them valuable for the treatment of rubber.

As many apparently widely different embodiments of this invention may be made without departing from the spirit and scope thereof, it is to be understood that we do not limit ourselves to the specific embodiments thereof except as defined in the appended claims.

We claim:

1. The process which comprises adding about 10 parts of squalene-hexahydrobromide to a composition comprising about 100 parts of glacial carbolic acid and about 1 part of anhydrous aluminum chloride held at about 66° C. to about 70° C. raising the temperature to about 80° C. and maintaining it for about 8 hours, cooling the resultant, treating with a weak caustic soda solution, filtering and acidifying the filtrate.

2. The product of the process of claim 1.

3. The process which comprises adding about 10 parts of squalene-dodecabromide to a composition comprising about 100 parts of glacial carbolic acid and about 1 part of anhydrous aluminum chloride held at about 70° C. to about 80° C. maintaining this temperature for about 4 hours, cooling the resultant, treating with a weak caustic soda solution, filtering and acidifying the filtrate.

4. The product of claim 3, which product fuses between about 120° C. and about 130° C.

5. The process which comprises heating a mixture of about 10 parts of squalene-dodecabromide, about 100 parts of alpha naphthol, about 1 part of aluminum chloride and about 100 parts of an inert solvent, gradually to about 120° C. over a period of about one and one half hours, maintaining this temperature for about 7 hours during which time about one additional part of aluminum chloride is added, removing the inert solvent, removing the excess alpha naphthol, extracting with a weak caustic soda solution and treating the extract with acid to precipitate the desired product.

6. The product of claim 5 which is a gelatinous body.

7. The process which comprises reacting a squalene-polyhalide with a hydroxy-aromatic hydrocarbon.

8. The process which comprises reacting a squalene-polyhalide with a hydroxy-aromatic hydrocarbon in the presence of a condensing agent.

9. The product which is substantially identical with the product obtainable by reacting a squalene-polyhalide with a hydroxy-aromatic hydrocarbon in the presence of aluminum chloride.

10. The product which is substantially identical with the product obtainable by reacting a squalene-hexahydrobromide with a hydroxy-aromatic hydrocarbon in the presence of aluminum chloride.

11. The product which is substantially identical with the product obtainable by reacting a squalene-dodecabromide with a hydroxy-aromatic hydrocarbon in the presence of aluminum chloride.

12. The product which is substantially identical with the product obtainable by reacting a squalene-polyhalide with phenol in the presence of aluminum chloride.

13. The product which is substantially identical with the product obtainable by reacting a squalene-polyhalide with alpha-naphthol in the presence of aluminum chloride.

14. The condensation product of a squalene-polyhalide and a hydroxy-aromatic hydrocarbon.

15. The product of reacting a squalene-polyhalide and a hydroxy-aromatic hydrocarbon in the presence of a condensing agent.

16. The process which comprises reacting a squalene-polyhalide with a hydroxy-aromatic hydrocarbon in the presence of aluminum chloride.

17. The product of reacting a squalene-polyhalide and a hydroxy-aromatic hydrocarbon in the presence of aluminum chloride.

18. The process which comprises reacting a squalene-polyhalide with an unsubstituted aryl hydroxide.

19. The process which comprises reacting a squalene-polyhalide with an unsubstituted aryl hydroxide in the presence of a condensing agent.

20. The product which is substantially identical with the product obtainable by reacting a squalene-polyhalide with an unsubstituted aryl hydroxide in the presence of aluminum chloride.

21. The product which is substantially identical with the product obtainable by reacting a squalene-hexahydrobromide with an unsubstituted aryl hydroxide in the presence of aluminum chloride.

22. The product which is substantially identical with the product obtainable by reacting a squalene-dodecabromide with an unsubstituted aryl hydroxide in the presence of aluminum chloride.

23. The condensation product of a squalene-polyhalide and an unsubstituted aryl hydroxide.

24. The product of reacting a squalene-polyhalide and an unsubstituted aryl hydroxide in the presence of a condensing agent.

25. The process which comprises reacting a squalene-polyhalide with an unsubstituted aryl hydroxide in the presence of aluminum chloride.

26. The product of reacting a squalene-polyhalide and an unsubstituted aryl hydroxide in the presence of aluminum chloride.

27. The process of making new phenolic condensation products soluble in alkali which comprises interacting a hydroxy substituted member of the group consisting of benzene and 1',4'-butadienylene substituted benzene with halogen derivatives of squalene.

28. The process of making new phenolic condensation products soluble in alkali which comprises interacting a hydroxy substituted member of the group consisting of benzene and 1',4'-butadienylene substituted benzene with halogen derivatives of squalene, in presence of a condensing agent.

29. The process of making new phenolic condensation products soluble in alkali which comprises interacting a hydroxy substituted member of the group consisting of benzene and 1',4'-butadienylene substituted benzene with halogen derivatives of squalene, in presence of aluminum chloride.

30. The process of making new phenolic condensation products soluble in alkali which comprises interacting a hydroxy substituted member of the group consisting of benzene and 1',4'-buta-dienylene substituted benzene with halogen derivatives of squalene in the presence of a solvent.

31. The process of making new phenolic condensation products soluble in alkali which comprises interacting a hydroxy substituted member of the group consisting of benzene and 1',4'-butadienylene substituted benzene with halogen derivatives of squalene in the presence of nitrobenzene.

32. The process of making new phenolic condensation products soluble in alkali which comprises interacting a hydroxy substituted member of the group consisting of benzene and 1',4'-butadienylene substituted benzene with halogen derivatives of squalene in the presence of a condensing agent and a solvent.

33. The process of making new phenolic condensation products soluble in alkali which comprises interacting a hydroxy substituted member of the group consisting of benzene and 1',4'-butadienylene substituted benzene with halogen derivatives of squalene in the presence of nitrobenzene and a condensing agent.

34. The process of making new phenolic condensation products soluble in alkali which comprises interacting a hydroxy substituted member of the group consisting of benzene and 1',4'-butadienylene substituted benzene with halogen derivatives of squalene in the presence of aluminum chloride and a solvent.

35. The process of making new phenolic condensation products soluble in alkali which comprises interacting a hydroxy substituted member of the group consisting of benzene and 1',4'-butadienylene substituted benzene with halogen derivatives of squalene in the presence of aluminum chloride and nitrobenzene.

HUGH MILLS BUNBURY.
WILFRED ARCHIBALD SEXTON.

CERTIFICATE OF CORRECTION.

Patent No. 1,991,999.　　　　　　　　　　　　　　　　　　　　　　　February 19, 1935.

HUGH MILLS BUNBURY, ET AL.

It is hereby certified that error appears in the printed specification of the the above numbered patent requiring correction as follows: Page 1, second column, line 39, for "bromide" read bromine; and that the said Letters Patent should be read with this correction therein that the same may conform to the record of the case in the Patent Office.

Signed and sealed this 26th day of March, A. D. 1935.

(Seal)　　　　　　　　　　　　　　　　　　　　　　　　　　　　　　Leslie Frazer
　　　　　　　　　　　　　　　　　　　　　　　　　　　　Acting Commissioner of Patents